June 14, 1960 E. GOLDBOHM ET AL 2,941,151
TIME DIVIDER FOR USE IN RADAR APPARATUS
Filed June 11, 1953 2 Sheets-Sheet 1

INVENTORS
ERICH GOLDBOHM
GERHARD PRINS
BY
AGENT

United States Patent Office 2,941,151
Patented June 14, 1960

2,941,151

TIME DIVIDER FOR USE IN RADAR APPARATUS

Erich Goldbohm and Gerhard Prins, Noordwijk, Netherlands, assignors, by mesne assignments, to North American Philips Company, Inc., New York, N.Y., a corporation of Delaware Filed June 11, 1953, Ser. No. 360,889

Claims priority, application Netherlands May 26, 1952

4 Claims. (Cl. 328—39)

The invention relates to time-dividers for use in radar apparatus for producing synchronising pulses of cycle frequency and distance-marking pulses of higher pulse recurrence frequency and has for its object to provide a construction of this time divider such that the pulses marking zero distance and forming part of the series of calibration pulses produced per cycle and marking at will, for example, distances of 500 m. or a multiple thereof, coincide accurately with the emitted pulses from the transmitter.

The time divider according to the invention is characterised by a main pulse generator, a pulse frequency dividing circuit, connected to the former and comprising a plurality of frequency dividing stages, for producing control-pulses of cycle frequency, a selector pulse generator, connected to the pulse frequency dividing circuit and provided with means for synchronizing the rear flanks of the selector pulses with the control-pulses of cycle frequency and by a normally cut-off pulse selector stage, connected to the main pulse generator, and to which the selector pulses are supplied for periodical release, the distance-marking pulses being derived from one of or a plurality of the frequency dividing stages and the synchronizing pulses of cycle frequency being derived from the output circuit of the pulse selector.

The last dividing stage of the pulse frequency dividing circuit is preferably constituted by a blocking oscillator and the sawtooth voltage produced thereby constitutes the grid control-voltage of an input tube of the selector pulse generator, this tube having a strongly negative bias voltage.

Special attention must be given to the construction of the selector pulse generator of the time divider according to the invention in order to ensure that the selector pulses have suitable form and duration independently of variations in supply voltages and tube tolerances.

It is therefore particularly of importance to provide negative feed-back for direct voltages for the input tube of the selector pulse generator and a positive feed-back circuit for alternating voltage, comprising a grid-controlled amplifying tube and to use a pentode having stabilized screen-grid voltages as an input tube for the selector pulse generator.

In order that the invention may be readily carried into effect, it will now be described in detail with reference to the accompanying drawing.

In order to clarify the following description numerical values are indicated by way of example; parts known per se are not explained in detail.

Figure 1:
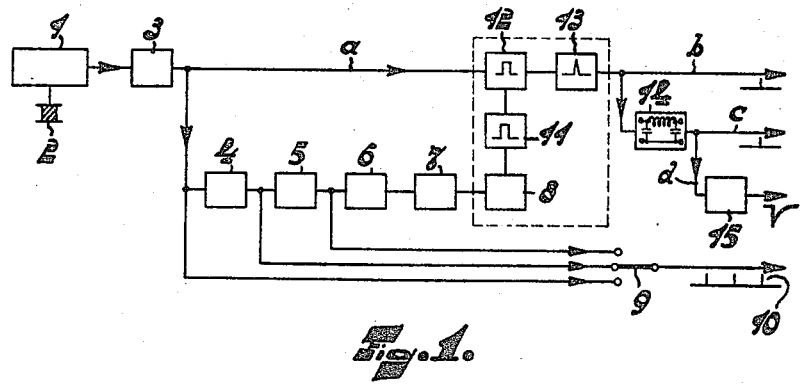
Fig. 1 shows the block diagram of a time divider according to the invention.

Referring to Fig. 1, reference numeral 1 designates an electron tube oscillator controlled by a crystal 2 of 100 kc./s. and comprising an output circuit tuned to 300 kc./s., the output voltage of which synchronizes a main pulse generator 3. The output pulses of, for example, 0.2 $\mu$sec., having a pulse recurrence-frequency of 300 kc./s., indicated in Fig. 2a, control a dividing circuit for the pulse recurrence frequency, comprising dividing stages 4, 5, 6, 7 and 8, constituted by blocking oscillators, dividing the input frequency of 300 kc./s. into 150, 75, 25, 8.333 and 2.778 kc./s., as is indicated in Figs. 2b to 2f. By means of a selector switch 9 marking pulses having a recurrence frequency of 300 kc./s. (500 m. calibration), 150 kc./s. (1000 m. calibration), or 75 kc./s. (2000 m. calibration) initiating from the main pulse generator 3 or the dividing stages 4 and 5 can be supplied to an indicator, for example, a panorama indicator (not shown).

Figure 2:
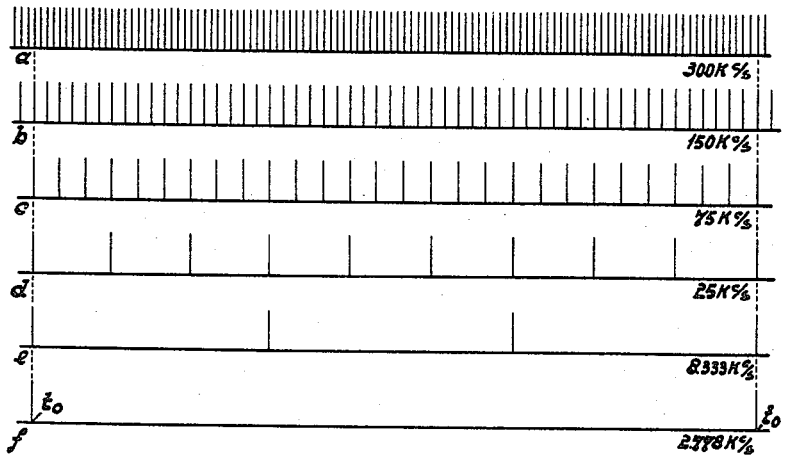
Fig. 2 shows voltage-time diagrams for the pulse-frequency dividing circuit.

In the last dividing stage 8 of the dividing circuit occur pulses of cycle frequency (2.778 kc./s.), which are not suitable for use as starting pulses for the transmitter pulse modulator, nor for use as synchronizing pulses for the time-base generator of the indicator or the sawtooth voltage oscillator for sensitivity control (swept gain) of the radar receiver, since across the dividing circuit time delays occur, which are small, it is true, but are liable to vary, so that the 2.778 kc./s. pulses of the dividing stage 8 occur in reality later time than is indicated in Fig. 2f at $t_0$ and exhibit, moreover, an interfering "jitter." It is, moreover, necessary to take into consideration additional delays in supply conductors, amplifying stages and control-stages for the further parts of the apparatus. It is therefore required to produce so-called "pre-pulses," from which the required starting pulses and synchronizing pulses can be derived, these pulses occurring at the correct instant with respect to the distance-marking pulses of 300 kc./s., 150 kc./s. or 75 kc./s., so that inter alia at the indicator the pulses marking the distance of zero metre coincide accurately with the transmitter pulses emitted.

For the aforesaid reasons the output pulses of cycle frequency from the last dividing stage 8 synchronize a selector pulse generator 11 in a manner such that the rear flanks of the selector pulses of, for example, 5 $\mu$sec. coincide with the output pulses of the dividing stage 8. The rear flanks of the selector pulses indicated in Fig. 3b thus occur at the instants of the cycle frequency pulses referred to in connection with Fig. 2f. These selector pulses release a normally cut-off pulse selector stage 12, which is connected through the conductor $a$ to the main pulse generator 3 and thus allows only those of the pulses supplied thereby (cf. Fig. 3c) to pass, which occur during the selector pulses, indicated in Fig. 3e owing to the bias voltage $V_c$ (indicated in Fig. 3d). Only the first pulse of the two pulses shown in Fig. 3e or, in the case of longer duration of the selector pulses, of a plurality of pulses allowed to pass during each selector pulse, these pulses being, of course not subjected to delays in the dividing circuit and to the resultant jitter, is utilized for controlling a self-blocking oscillator 13, serving as a pulse producer (Fig. 1) this oscillator having a reduced sensitivity from its starting instant till approximately the occurrence of the subsequent selector pulse and being thus incapable of responding to a second pulse from the main pulse generator, occurring during a selector pulse. Fig. 3f shows the output pulses of cycle frequency, i.e. the pre-pulses from the pulse producer 13.

Through the conductor $b$ the pre-pulses are supplied as synchronizing pulses to a time-base generator (not shown), which thus starts a few microseconds before the occurrence of a transmitter pulse (instant $t_o$); this is desirable, inter alia to ensure that the time-base voltage should not exhibit oscillatory compensation phenomena at the instant $t_o$.

The pre-pulses of the pulse-producer 13, after having been delayed by means of an artificial cable 14 of, for example, variable electrical length, are supplied by way of conductor c to the pulse modulator (not shown) of the transmitter, in a manner such that the transmitter pulses occur at the instants $t_o$ and hence coincide with the pulses marking the distance of zero metre. The delayed pre-pulses serve, moreover, to synchronize (via the conductor d) a sawtooth-voltage oscillator 15, the output voltage of which is used for sensitivity control (swept gain) of the radar receiver.

Figure 4:
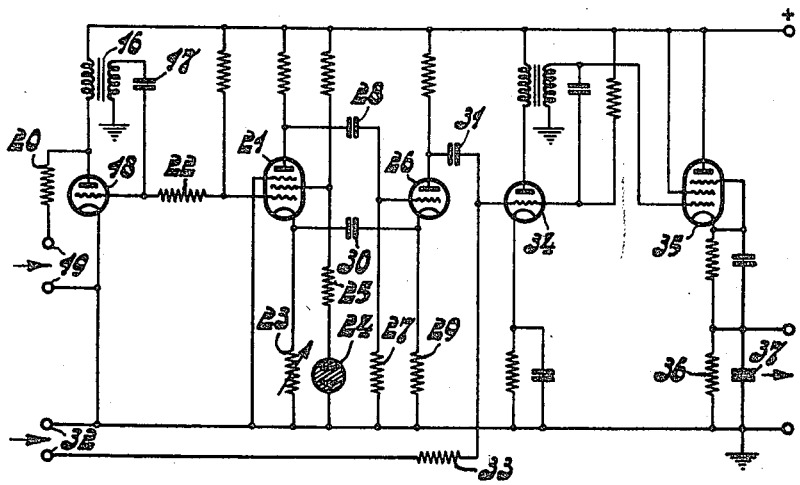
Fig. 4 is a detail diagram for the part circumscribed by a broken line in the block diagram shown in Fig. 1, this part comprising inter alia the selector pulse generator and the pulse selector stage.

The part of the block diagram circumscribed by a broken line in Fig. 1 is shown in Fig. 4 in a detail diagram in order to explain the stability requirements for this part of the arrangement.

Figure 3:
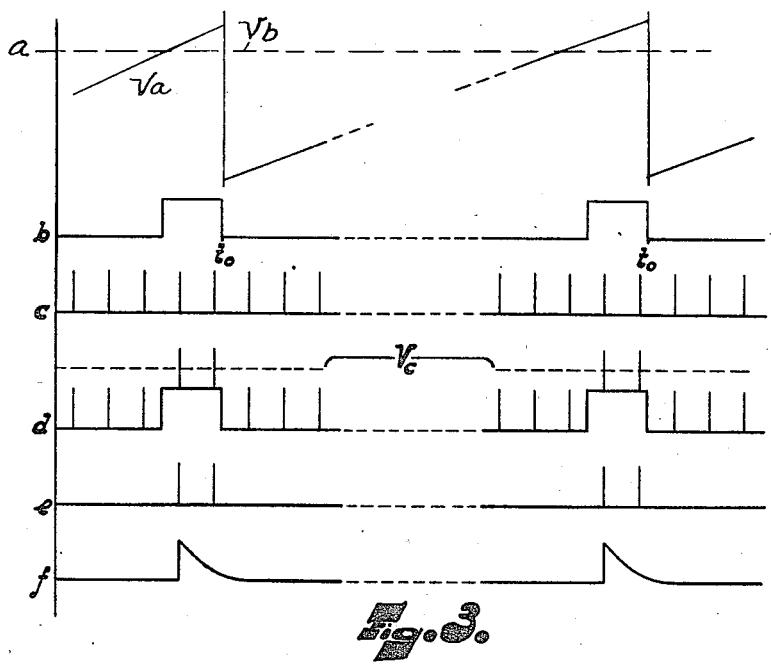
Fig. 3 shows voltage-time diagrams for the selector pulse generator, the pulse selector stage and a subsequent pulse producer, on a time scale which is exaggerated compared with that of Fig. 2.

As is shown in Fig. 4, the last dividing stage 8 comprises a blocking oscillator having a triode 18 with strong feed-back by way of a feed-back transformer 16 and a capacitor 17; to this tube are supplied via connecting terminals 19 and decoupling resistor 20 the output pulses of the preceding dividing stage. A sawtooth voltage, indicated in Fig. 3a at $V_a$, having high peaks at the instants of response, occurs at the control-grid of this triode; this voltage is supplied through a resistor 22 to an input amplifying tube 21 of the selector pulse generator. The tube 21 is normally cut-off and takes anode current only if and as long as the input voltage exceeds the voltage level indicated by $V_b$ in Fig. 3a. One period of the sawtooth voltage indicated in Fig. 3a takes 360 $\mu$sec. and the total voltage variation during the slowly rising sawtooth flank is, for example, 70 v. If the desired duration of the selector pulse is about 5 $\mu$sec., the voltage $V_a$ exceeds the threshold voltage $V_b$ only by about $5/360 \times 70 = 1$ v. In order to obtain a substantially rectangular selector pulse the tube 21 must, consequently, go over from its inoperative position to full anode current, at a fraction of 1 v. of voltage variation, whilst the position of the sawtooth voltage $V_a$ with respect to the threshold voltage $V_b$ must not be liable to vary. In order to ensure this, the input amplifying tube 21 is constituted by a pentode comprising a negative feed-back resistor 23, included in the cathode lead and adjustable in order to vary the duration of the selector pulses and having a screen-grid voltage stabilised by means of a stabilizing tube 24. The resistor 23 operates to vary the duration of the selector pulses by varying the potential of the cathode and hence the effective grid bias of the tube. This action in turn brings about a variation of the threshold voltage $V_p$ of the selector pulse generator and hence a variation of the duration of the pulse produced thereby. Preferably, the resistor 23 is so adjusted that the pulses produced by the generator are initiated at a time interval approximately midway between times of occurrence of two of the high frequency pulses from the main pulse generator. This is shown in Fig. 3 at b and c respectively. Since the cathode voltage of the pentode 21 varies with supply voltage variations, which must not affect the voltage between the screen-grid and the cathode of the pentode 21, a resistor 25 is connected in series with the stabilising tube 24. For the pentode 21 provision is made of a positive feed-back, acting only for alternating voltage, via a triode 26. The control-grid circuit of the feed-back triode, having a grid resistor 27, is coupled via a capacitor 28 with the anode of the pentode 21. The cathode lead of the triode 26 includes a resistor 29 (not shunted), which is connected through a coupling capacitor 30, for alternating voltages, in parallel with the cathode resistor 23, of the pentode 21. By these measures a dynamic control-grid space of tube 21 of a few hundredths volts is obtained at a substantially satisfactory stabilisation of the direct-current position for the input pentode 21. The desired selector pulses indicated in Fig. 3b are derived from the anode of the triode 26 and supplied through a coupling capacitor 31, together with pulses initiating via input terminals 32 and decoupling resistor 33 from the main pulse generator, to the input control-grid of a pulse producer, comprising a biassed triode blocking oscillator 34 (cf. bias voltage $V_c$ of Fig. 3d) and a pentode 35, connected as a cathode-follower. Of the 300 kc./s. pulses supplied from the main pulse generator Fig. 3d shows only the two pulses occurring during the selector pulses, which pulses may give rise to the occurrence of anode current in the input triode. The first pulse of each of these pairs of pulses causes the triode blocking oscillator 34 to respond, this oscillator then becomes insensitive to subsequent pulses and exhibits a reduced sensitivity until approximately the occurrence of the subsequent pair of pulses, owing to a suitable choice of the time constant of the grid circuit of the blocking oscillator. The output pulses of the blocking oscillator 34 control a pentode 35, of which a cathode resistor 36 of, for example, 10,000 ohms, serving as an output resistor, is shunted by a capacitor 37 of, for example, 250 pf. in order to obtain a weaker slope of the rear flanks of the output pulses, as is indicated in Fig. 3f. The front of the output pulses is very steep (duration about 0.15 $\mu$sec.), whereas the rear flanks of these pulses slope down with a time constant of 2.5 $\mu$sec.

It will be obvious that the detail arrangement shown in Fig. 4 may be varied within the scope of the invention; however, as is fully described above, particular attention must be given to the stability requirements for the selector pulse generator. In view of the stability obtained in practice, the detail arrangement of the selector pulse generator is comparatively simple and hence particularly favourable for the present purpose.

What is claimed is:

1. A time divider for use in radar apparatus for producing synchronizing pulses of cycle frequency and distance-marking pulses having a higher frequency of pulse recurrence, comprising a main pulse generator, a pulse-frequency dividing circuit connected to said main pulse generator and comprising a plurality of successively connected frequency dividing stages for producing control pulses of cycle frequency, a selector pulse generator, means connected to feed said control pulses to said selector pulse generator to synchronize the rear flanks of said selector pulses with said control pulses, a normally cut-off pulse selector stage connected to said main pulse generator, means connected to feed said selector pulses to said pulse selector stage for periodical release thereof to select pulses from said main pulse generator, means connected to derive said distance-marking pulses from at least one of said frequency dividing stages, and means connected to derive said synchronizing pulses of cycle frequency from said pulse selector stage.

2. The time divider in accordance with claim 1, in which the last one of said successively connected frequency dividing stages comprises a blocking oscillator which produces a sawtooth voltage having a positive-going polarity, and in which said selector pulse generator comprises a tube having a negatively biased grid, and including means connected to feed said sawtooth voltage to said grid.

3. The time divider in accordance with claim 2, in which the bias voltage of said negatively biased grid is chosen so that said tube takes anode current at times approximately midway between the occurrence of pulses from said main pulse generator.

4. The time divider in accordance with claim 1, including a pulse-producing self-blocking oscillator connected to said pulse selector stage to receive and be actuated by said selected pulses, and means connected to reduce the actuation sensitivity of said self-blocking oscillator for approximately one period of the cycle frequency after each actuation thereof.

References Cited in the file of this patent

UNITED STATES PATENTS

| | | |
|---|---|---|
| 2,403,626 | Wolff | July 9, 1946 |
| 2,405,239 | Seeley | Aug. 6, 1946 |
| 2,466,711 | Kenyon | Apr. 12, 1949 |
| 2,586,605 | Blumlein | Feb. 19, 1952 |
| 2,602,140 | Fink | July 1, 1952 |
| 2,713,160 | Trachtenberg | July 12, 1955 |

FOREIGN PATENTS

| | | |
|---|---|---|
| 510,881 | Great Britain | Aug. 8, 1939 |